United States Patent [19]
Hoffmann et al.

[11] 3,790,146
[45] Feb. 5, 1974

[54] FLUID FILLED SUPPORTING LEG

[75] Inventors: Hans-Juergen Hoffmann, Schalksmuehle-Heedsfeld; Manfred Loehr, Letmathe; Hubert Pfannkuche, Lichtendorf, all of Germany

[73] Assignee: Hoesch Werke AG, Dortmund, Germany

[22] Filed: Oct. 24, 1972

[21] Appl. No.: 300,377

[52] U.S. Cl. .......... 267/64 R, 188/322, 267/DIG. 1, 280/124 F
[51] Int. Cl. .......................................... B60g 15/12
[58] Field of Search.. 267/DIG. 1, 64 R; 91/341, 342; 280/124 F; 188/322, 298

[56] References Cited
UNITED STATES PATENTS

| | | | |
|---|---|---|---|
| 1,486,911 | 3/1924 | Messier | 267/DIG. 1 |
| 3,051,507 | 8/1962 | Fiala | 267/DIG. 1 |
| 3,536,312 | 10/1970 | Lohr | 267/64 R |
| 3,549,168 | 12/1970 | Swanson | 280/124 F |

Primary Examiner—George E. A. Halvosa
Attorney, Agent, or Firm—Michael S. Striker

[57] ABSTRACT

A fluid filled supporting leg or shock absorber has a cylinder with an end wall having duct means connecting a valve chamber into which a pressure conduit opens, with a working chamber formed in the cylinder by a piston having throttling ducts therethrough. A lifting valve for up-regulation is located in a duct and has a portion in the working chamber cooperating with a control valve for down-regulation, which is coupled with the piston in a predetermined relative position of piston and cylinder. The lifting valve is held in an open position by the control valve during up-regulation so that fluid flows into the working chamber until the control valve is coupled with the piston, and is moved away from the lifting valve which stops the flow into the working chamber. When the piston is moved during down-regulation to reduce the working chamber, fluid flows therefrom into the pressure conduit until the control valve is moved by the piston to a position closing the duct means.

10 Claims, 6 Drawing Figures

FIG.1
FIG.2
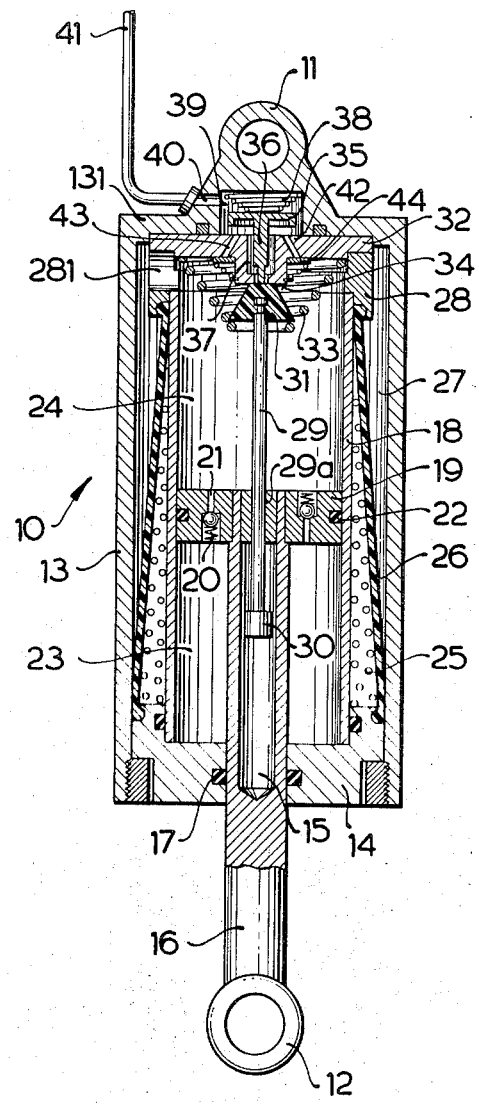
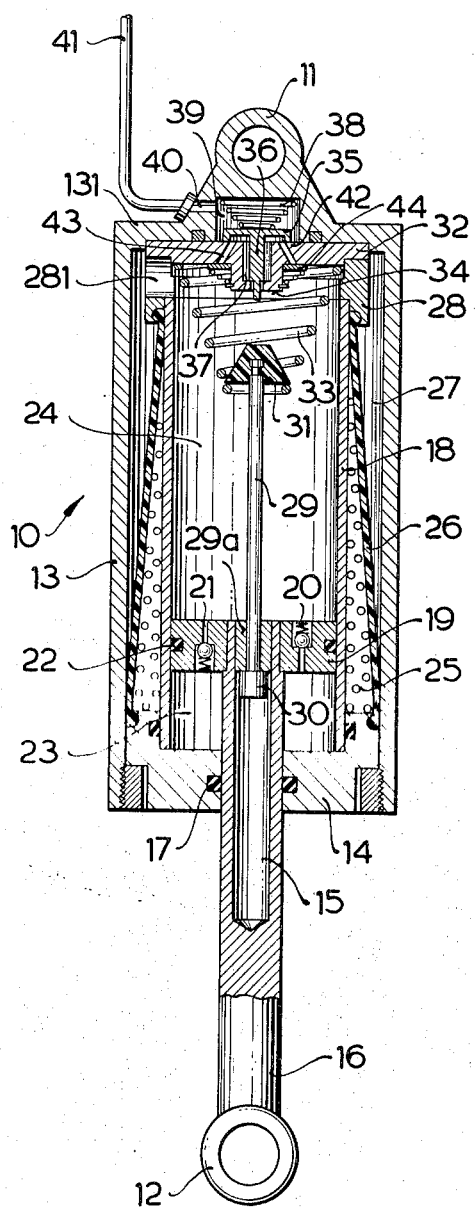

FLUID FILLED SUPPORTING LEG

BACKGROUND OF THE INVENTION

Fluid filled supporting legs or shock absorbers are known, which are either provided with two pressure conduits, or with only one pressure conduit, which has advantages. The French Pat. 1,477,042 discloses a fluid filled supporting leg with an inner level regulation device, and having only one connection for a supply conduit. A lever, operated by two opposing springs, controls the up-regulating valve and the down-regulating valve. The level position depends on the precise tuning of the two springs, and also on the differential pressure between the supporting leg and the pressure source. Since the lever is tipped to close either one or the other valve, the level of the chassis varies during movement of the motorcar. Since the pressure source is a pump which con-tinuously operates, the outer supporting leg is up-regulated, and the inner supporting leg is down-regulated while the car moves along a curve. An exact, road-depending level regulation cannot be obtained by the apparatus of the prior art.

SUMMARY OF THE INVENTION

It is one object of the invention to provide a shock absorbing fluid filled supporting leg which has an inner level regulating device, and only one pressure conduit for connection with an outside pressure source, and avoids the disadvantages of the prior art, so that the level regulation functions precisely depending on the road in such a manner that an uneven load distribution in the motorcar is equalized, while a flow of oil between the inner and outer supporting legs during movement of the car along a curve is prevented.

With this object in view, an embodiment of the present invention provides a down-regulating control valve, biassed by a tension spring, and operated from the piston by means of a control member which, during up-regulation holds a spring biassed lifting valve, which is located in an end wall of the cylinder, in an open position. When the desired level is obtained, the control valve separates from its valve seat, and closes the supply of pressure fluid from the pressure fluid conduit. During the down-regulation, when the piston rod projects farthest from the end of the cylinder, the fluid flows out of the working chamber formed by the piston through a bore and through the control valve until closed. The lifting valve has a stem which, when the lifting valve is closed, projects from the valve seat of the control valve when the control valve is spaced from the valve seat.

In one embodiment of the invention, the lifting valve cooperates with ducts closed by a spring biassed check valve which prevents flow into the working chamber through the respective ducts but permits flow of working fluid out of the working chamber into the pressure conduit.

In another embodiment of the invention, the lifting valve has a stem carrying at its ends two valve heads, one of the valve heads being located in the working chamber and engaged by the control valve. The supporting leg has an outer cylinder and an inner cylinder forming an annular chamber in which a membrane forms a pneumatic spring, and an oil chamber communicating with the working chamber in the cylinder. In order to obtain a destabilizing effect during movement of the car along a curve, the oil chambers of outer and inner supporting legs are connected by a conduit.

When three supporting legs are provided for a motorcar, two of the supporting legs are advantageously connected with each other by a conduit connected to radial bores in the end walls of a respective two supporting legs, which open into the duct in which the lifting valve is located.

An advantage of the fluid filled supporting leg according to the invention, in which only one pressure conduit is provided, resides in that a second pressure conduit is not necessary, which has the advantage of fewer sealing points which may cause oil losses due to the high pressure in the system. Another advantage is that the valves used in the apparatus of the invention are axially moving valves, contrary to radially moving valves, which have a greater wear. It is also an advantage that during drive along a curve, the supporting leg on the outside of the curve, which has a higher pressure as the supporting leg inside of the curve, closes automatically, so that flow of oil from the outer to the inner supporting leg is prevented, saving a special interlocking device, such as a valve operated by the centrifugal force.

Another advantage of the invention is that an outside level sensor can be omitted, if a three point regulation is provided. At the shaft which has the common regulating point for two supporting legs, the regulation can be effected by one of the two regulating legs. Nevertheless, the locking during movement along the curve can be obtained by the supporting legs, without an outside additional device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a sectional view illustrating a fluid filled supporting leg in accordance with the invention in an up-regulating position;

FIG. 2 is a sectional view illustrating the embodiment of FIG. 1 in a down-regulating position;

DESCRIPTION OF THE PREFERRED EMBODIMENTS

Figure 3:
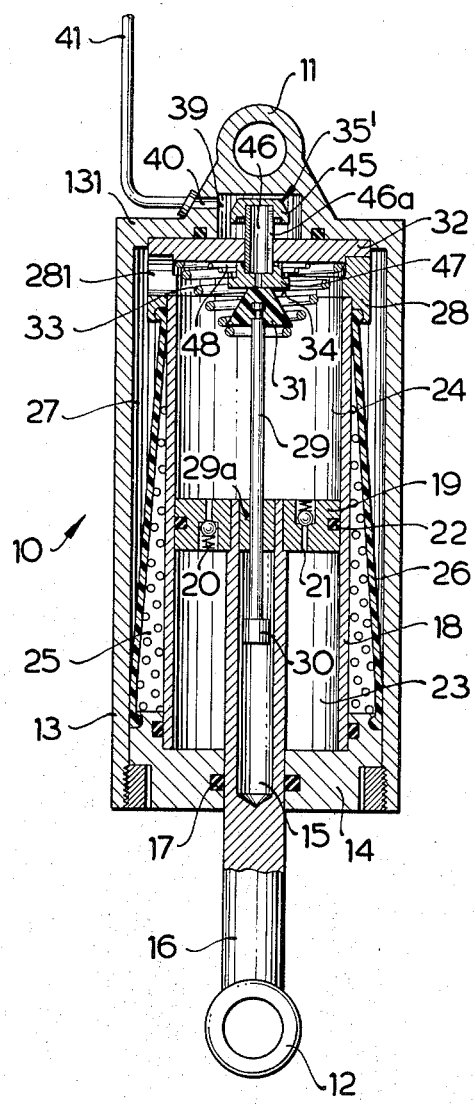
FIG. 3 is a sectional view illustrating a second embodiment of the invention in the up-regulating position.

Referring first to FIGS. 1 and 2, a supporting leg, generally indicated at 10, has an attaching means 11 secured to a chassis, not shown, and an attaching means 12 secured to the wheel shaft of a motorcar, not shown. The upper attaching means 11 is a portion of an end wall 131 of an outer cylinder 13 whose open end is closed by a cover 14 which has a bearing bore for guiding a piston rod 16 connected with attaching means 12, and having a sealing ring 17 in the bearing bore. An inner cylinder 18 has an end wall 32 secured to the end wall 131 of the outer cylinder 13, and is divided by a piston 19 into a first working chamber 24, and into a second annular working chamber 23 surrounding piston rod 16 which has an inner cavity 15. Piston 19 is provided with throttling ducts 21 in which spring biassed check valves 20 are located. A sealing ring 22 between the inner cylinder 18 and the piston 19, prevents flow between the working chambers 23 and 24 on opposite sides of piston 19. The outer cylinder 13 and the inner cylinder 18 form an annular chamber in which a membrane 26 forms a pneumatic spring 25, and an outer oil chamber 27 which communicates through an opening 281 in the inner cylinder 18 with the first working chamber 24.

The piston 19 is fixedly secured to the piston rod 16 in whose cavity 15, a control rod or member 29 is located which has at its end located in cavity 15, an abutment 30, while a control valve 31, biassed by a frustoconical spring 33, is carried by the other end of the control rod 29. Spring 33 is a tension spring, and urges control valve 31 against a valve seat 34 formed on a projection of the end wall 32 surrounding a bore 37 in which the stem 36 of a lifting valve 35 is located. The end of stem 36 is a narrow pin, located in a correspondingly narrow bore portion of the stepped bore 37, and having a position, see FIG. 2, in which the thin end of the valve stem 36 projects downward from valve seal 34, which is possible when the control valve 31 is in the position of FIG. 2. When control valve 31 is in the position of FIG. 1, abutting valve seat 34, no fluid can flow from the working chamber 24 into the bore 37 and from there into the valve chamber 39 which communicates through a channel 40 with the pressure conduit 41. Lifting valve 35 has the shape of a mushroom, and a large head located in the valve chamber 39. A pressure spring 38 biasses the lifting valve 35 to the closed position shown in FIG. 2, but when control valve 31 abuts valve seat 34 due to the action of spring 33, lifting valve 35 is raised to the position shown in FIG. 1 against the action of spring 38.

The end wall 32 is penetrated by ducts 43 having upper ends located in the valve chamber 39 under the large head of lifting valve 35, and other ends opening into working chamber 24 and being closed by an annular check valve 44 biassed by a spring 48, and surrounding the inner boss on end wall 32 which has the valve seat 34 for control valve 31. Due to check valve 44, no fluid can flow from working chamber 24 through ducts 43 into valve chamber 39, but flow in the opposite direction is permitted by check valve 44 until lifting valve 35 moves to the position shown in FIG. 2, closing the upper ends of ducts 43.

During the up-regulation operation illustrated in FIG. 1, oil flows from the pressure conduit 41, through channel 40 into valve chamber 39, through ducts 43, and check valve 44 into the working chamber 24. The down-regulating control valve 31 is biassed by a spring 33 to engage the valve seat 34 so that no fluid can flow through the duct or stepped bore 37. Due to the engagement of control valve 31 with the stem 36 of lifting valve 35, the head of lifting valve 35 is raised so that the flow of fluid through ducts 43 is possible.

During the flow of fluid into working chamber 24, fluid also flows through opening 281 into the oil chamber 27, and compresses the pneumatic resilient means 25.

When the desired level of the chassis is obtained, the down-regulating control valve 31 is lifted off its valve seat 34 since the piston 19 engages the abutment 30 of the control rod 29 during its downward movement. The control valve 31 releases not only its valve seat 34, but also the thin end of stem 36, permitting spring 38 in valve chamber 39 to press the lifting valve 35 to a position closing the ducts 43, substantially as shown in FIG. 2. When the lifting valve 35 closes ducts 43, flow from pressure conduit 41 into the working chamber 24 is terminated.

During the down-regulation in the position of FIG. 2, the down-regulating control valve 31 is spaced from its seat 34, and the stem 36 projects from valve seat 34. Spring 33 is tensioned by the downward movement of control valve 31 with control rod 29, and abutment 30 engaged by piston 19. The oil flows out of working chamber 24 through the stepped bore or duct 37 into valve chamber 39, and through conduit 40 into pressure conduit 41. At the same time, the pneumatic resilient means 25 relaxes, and piston means 19, 16 move upward in the position of FIG. 2 until the control valve 31 engages its valve seat so that the abutment 30 moves away from piston 19. Engagement of valve seat 34 by control valve 31 closes the flow through the stepped bore 37, so that no further oil can flow out of working chamber 24.

Figure 4:
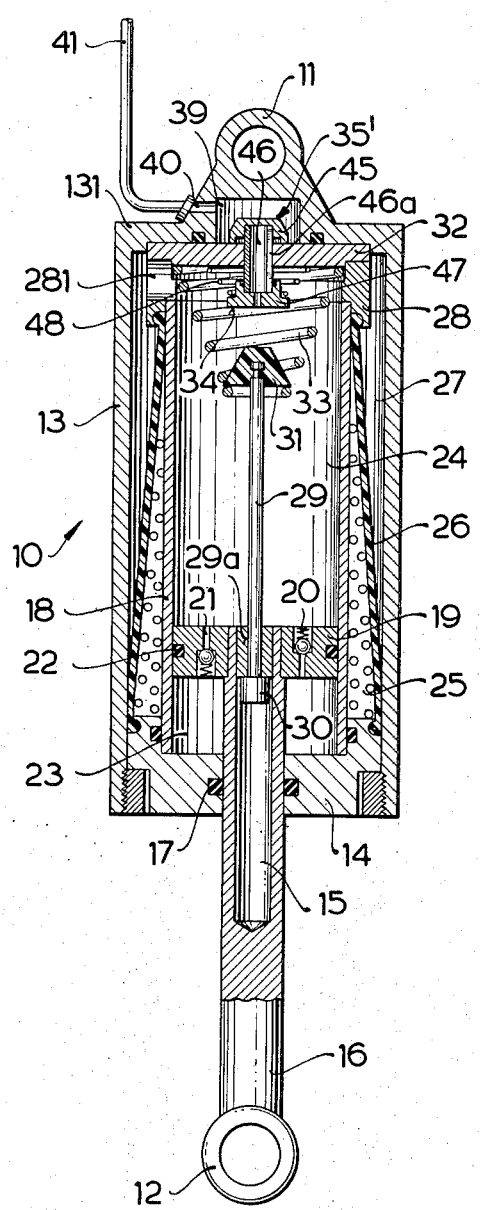
FIG. 4 is a sectional view illustrating the embodiment of FIG. 3 in the down-regulating position.

In the modified embodiment illustrated in FIGS. 3 and 4, lifting valve 35' is a double valve including a first head 45 in valve chamber 39, a hollow slotted stem 46, and an inner valve head 47 penetrated by a channel surrounded by the valve seat 34 with which the control valve 31 cooperates, as described above. A spring 48 acts on the valve head 47 to bias lifting valve 35' downward, but the pressure exerted by spring 33 on control valve 31 is greater.

During the up-regulation, the control valve 31 biassed by spring 33 holds the double valve 35' in the position illustrated in FIG. 3. Oil flows from pressure conduit 41 through duct 40 and valve chamber 39, and through the slots of the valve stem 46 radially into the longitudinal channel 46a in the hollow stem 46 so that the head 47 is lifted off the end wall 32 against the action of spring 33 so that the oil flows into working chamber 24. The stem 46 is preferably a split sleeve fitting into a recess of the valve head 45. The channel 46a in the hollow stem 46 performs the function of the duct 37 in the embodiment of FIGS. 1 and 2, and also of ducts 43 and check valve 44.

When the desired level is obtained, control valve 31 is lifted off the valve seat 34 due to the coupling of piston 19 with abutment 30 and control rod 29, and spring 48 acts on the valve head 47, and thereby also on the stem 46 and the outer valve head 45, so that the double valve 35' moves downward, and valve head 45 engaging the outer surface of the end wall 32 closes the flow through the hollow slotted stem 36.

During the down-regulation operation illustrated in FIG. 4, the control valve 31 is lifted off its valve seat 35 so that oil flows out of working chamber 24, through the opening in valve head 47, valve stem 46, and into pressure conduit 41 while the valve head 45 is raised by fluid pressure against the action of spring 48.

In the event that the motorcar has a complete resilient suspension with three point regulation, two supporting legs according to the invention can be connected with each other in such a manner that the regulation is controlled by one of the two supporting legs, while the other supporting leg follows.

Figure 5:
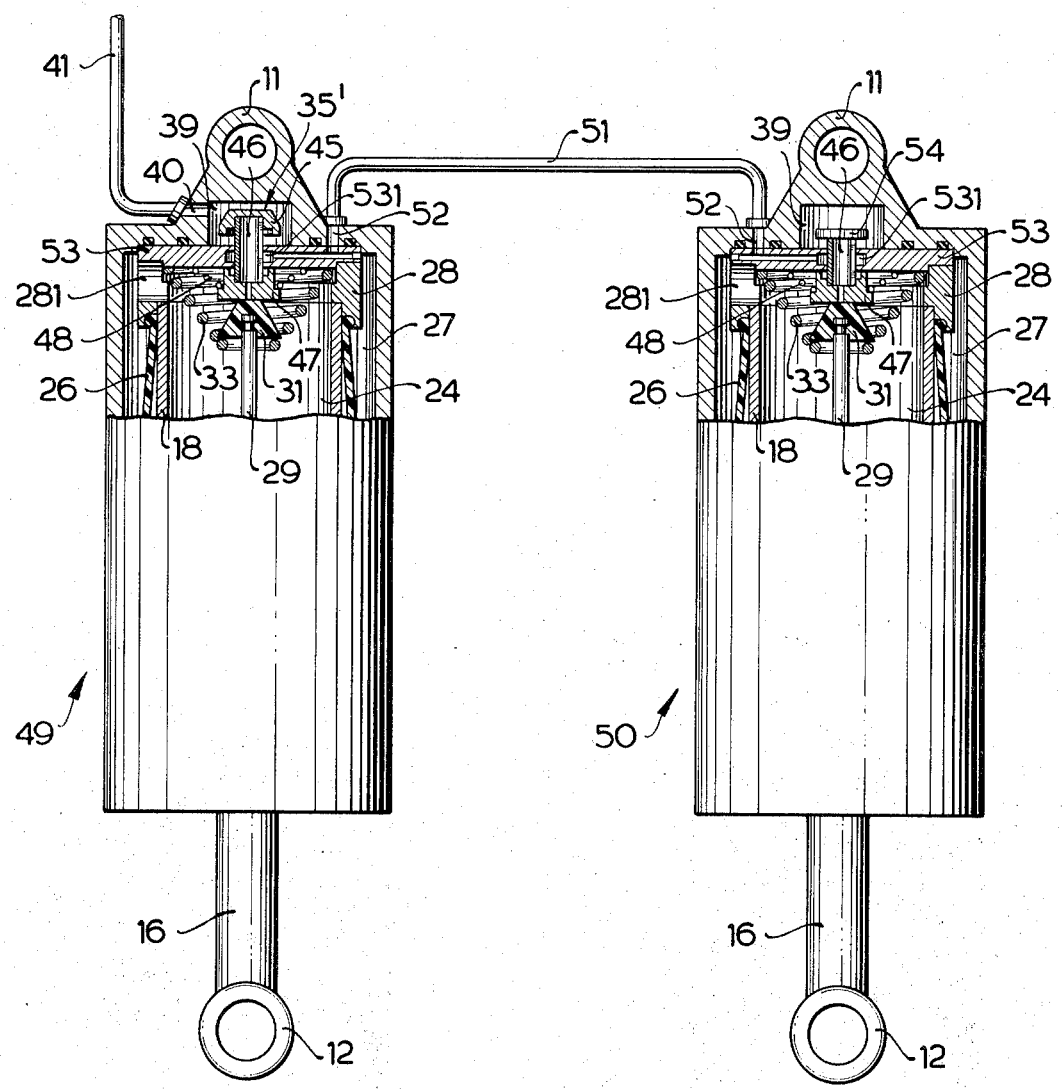
FIG. 5 is a side view, partially in section, illustrating two supporting legs according to the invention connected with each other by a connecting conduit so that the supporting leg on the left of FIG. 5 controls the up-regulation for both supporting legs.

As shown in FIG. 5, which shows on the left a supporting leg in accordance with the embodiment of FIG. 3, and on the right a similar embodiment in which the pressure conduit 41 and the corresponding bore 40 are omitted. The end plate 53 is formed with the radial duct 52 whose inner end opens into an annular port 531 communicating with the inner channel in valve stem 46 through the slots of stem 46, while the outer end of the radial duct 52 is connected with a connecting conduit 51 which opens in a corresponding radially extending duct 52 in the end plate 53 of the supporting leg 50. The valve chamber 45 of supporting leg 49 is connected with the pressure conduit 41, and connecting conduit 51 performs the function of the pressure conduit in the supporting leg 50. Due to the provision of the connecting conduit 51 and the radial ducts 52, the up-regulation for both supporting legs 49, 50 is terminated when the outer valve head 49 engages the outer face of the end wall 32 and interrupts the flow into the working chamber 24.

The down-regulation is carried out separately for the two supporting legs 49 and 50, until the control valves 31 prevent a further flow of oil out of the working chambers of the supporting legs 49, 50. The outer valve head 49 of the embodiment of FIG. 3 can be replaced by a simple stop 54 in the supporting leg 50 since no connection with the pressure conduit 41 is provided.

The arrangement of FIG. 5 has the advantage that during movement of the motorcar along a curve, the radial outer supporting leg which receives higher pressure, prevents the outflow of oil by closing the down-regulating control valve 31.

Figure 6:
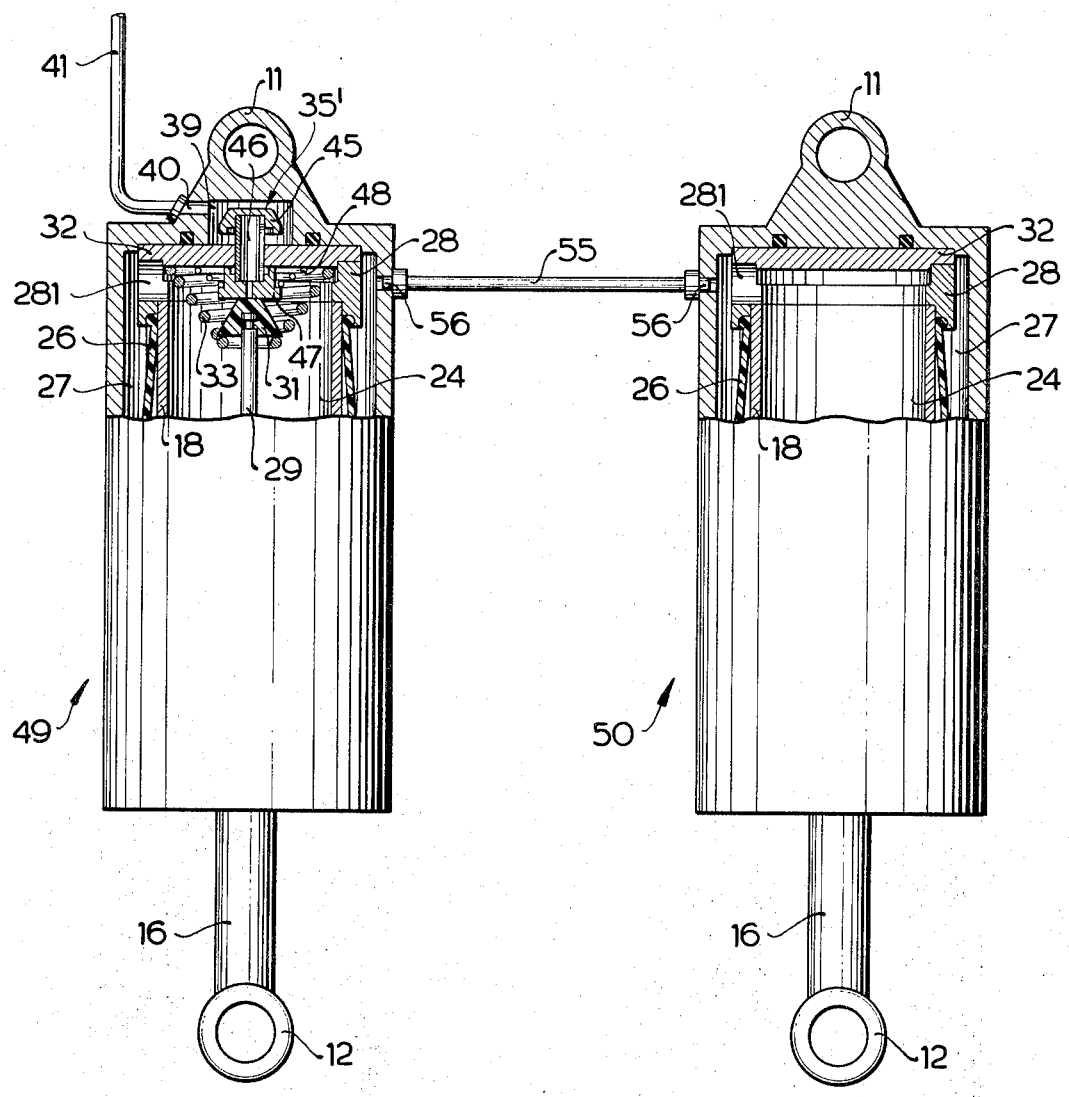
FIG. 6 is a side view, partially in section illustrating two supporting legs according to the embodiment of FIGS. 3 and 4 having interconnected oil chambers.

If during drive along a curve, a destabilizing effect is to be obtained, the supporting legs 49, 50 can be connected by a connecting conduit 55, as shown in FIG. 6. The oil chambers 27 in the supporting legs 49 and 50 have openings 56 in the outer cylinder 13, connected by conduit 55. In this arrangement the up-regulation as well as the down-regulation is fully controlled by the supporting leg 49. In the controlled supporting leg 50, the valve head 47, the valve stem 46, the stop 54, and the control valve 31 can be omitted.

It will be understood that each of the elements described above, or two or more together, may also find a useful application in other types of fluid filled supporting legs or shock absorbers differing from the types described above.

While the invention has been illustrated and described as embodied in a fluid filled supporting leg with a lifting valve and a control valve operating the lifting valve, and being coupled with a piston forming a working chamber in a cylinder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefor, such adaptations should and are intended to be comprehended within the meaning and range of equivalence of the following claims.

What is claimed as new and desired to be protected by letters Patent is set forth in the appended claims.

We claim:

1. Fluid filled supporting leg, comprising cylinder means having at one end an end wall means formed with a valve chamber and with duct means connecting said valve chamber with the interior of said cylinder means; pressure conduit means communicating with said valve chamber; piston means including a piston rod projecting from the other end of said cylinder means, and a piston located in the interior of said cylinder means and dividing the same into a first working chamber communicating with said duct means, and a second working chamber, said piston being formed with an axial guide way and throttling conduit means connecting said first and second working chambers; lifting valve means in said valve duct means biassed to a closed position, and having a portion located in said first working chamber in said closed position; and control valve means including a control member mounted in said guide way for movement with, and relative to said piston, a control valve at one end of said control member cooperating with said valve duct means and with said portion of said lifting valve, spring means biassing said control valve to engage said portion and to lift said lifting valve means to an open position, and an abutment at the other end of said control member located in said second working chamber so that when pressure fluid flows from said pressure conduit means into said valve chamber while said cylinder means and piston means move apart and said lifting valve is held by said control valve in said open position, pressure fluid flows through said duct means into said first working chamber until said piston engages said abutment and moves said control member with said control valve away from said portion whereby said lifting valve means moves to said closed position and stops the flow from said pressure conduit means into said first working chamber, and so that when said piston means is moved into said cylinder means, fluid from said first working chamber flows through said duct means and said valve chamber into said pressure conduit until said control valve effects closing of said duct means.

2. Fluid filled supporting leg as claimed in claim 1 wherein said lifting valve means is mushroom-shaped and has a large head, and a stem located in said duct means and having said projecting portion at the end thereof.

3. Fluid filled supporting leg as claimed in claim 2 wherein said duct means include at least one first duct through said end wall means closed by said head of said lifting valve in said closed position, and a second duct in which said stem is located and having a valve seat in said first working chamber; comprising check valve means in said first duct closing flow from said first working chamber into said valve chamber; and wherein said control valve closes said second duct when engaging said valve seat, and also engaging said portion for moving said lifting valve to said open position in which said head opens said first ducts whereby fluid can flow from said valve chamber into said first working chamber.

4. Fluid filled supporting leg as claimed in claim 3 wherein said second duct is an axial bore for guiding said stem, and being surrounded by said valve seat; and wherein said first duct is located radially outward of said second duct and has an end located in said valve chamber and covered by said head of said lifting valve in said closed position.

5. Fluid filled supporting leg as claimed in claim 1 wherein said duct means include an axial bore through said end wall means connecting said valve chamber with said first working chamber; and wherein said lifting valve means includes a stem located in said bore, a first head at one end of said stem located in said first working chamber and a second head at the other end of said stem and located in said valve chamber, said first head having a channel communicating with said valve chamber and being surrounded by a valve seat for said control valve.

6. Fluid filled supporting leg as claimed in claim 5 wherein said stem has a longitudinal duct connected with said channel, and a slotted tubular wall connecting said longitudinal duct with said valve chamber when said second head is spaced from said end wall means due to abutment of said control valve on said valve seat.

7. Fluid filled supporting leg as claimed in claim 6 wherein said end wall means is further formed with a radial duct having an inner end communicating with said axial bore, and an outer end which opens on the outer surface of said end wall means; and comprising a pressure conduit for connecting said outer end of said radial duct with an other fluid filled supporting leg.

8. Fluid filled supporting leg as claimed in claim 1 wherein said cylinder means include an inner cylinder cooperating with said piston, and an outer cylinder surrounding said inner cylinder and forming an annular chamber therewith; comprising a membrane in said annular chamber forming therein a pneumatic resilient means filled with air, and an oil chamber; and wherein said inner cylinder has an opening connecting said first working chamber with said oil chamber.

9. Fluid filled supporting leg as claimed in claim 8 wherein said outer cylinder has an opening communicating with said oil chamber and adapted to be connected with a corresponding opening in another fluid filled supporting leg.

10. Fluid filled supporting leg as claimed in claim 1 comprising first attaching means secured to said end wall means, and second attaching means secured to said projecting end of said piston rod, and adapted to be connected with the chassis and the wheel means of a motorcar, respectively.

* * * * *